US012754059B2

(12) United States Patent
Quezada et al.

(10) Patent No.: US 12,754,059 B2
(45) Date of Patent: Oct. 6, 2026

(54) DYNAMIC CALIBRATION AND CORRECTION OF STROKE VOLUME OF A PUMP

(71) Applicant: Fenwal, Inc., Lake Zurich, IL (US)

(72) Inventors: Francesca S. Quezada, Chicago, IL (US); Nicholas R. DiCola, Mundelein, IL (US); Jeffrey R. Maher, Lake Barrington, IL (US)

(73) Assignee: Fenwal, Inc., Lake Zurich, IL (US)

( * ) Notice: Subject to any disclaimer, the term of this patent is extended or adjusted under 35 U.S.C. 154(b) by 274 days.

(21) Appl. No.: 18/761,387

(22) Filed: Jul. 2, 2024

(65) Prior Publication Data

US 2025/0012618 A1 Jan. 9, 2025

Related U.S. Application Data

(60) Provisional application No. 63/525,005, filed on Jul. 5, 2023.

(51) Int. Cl.
*G01F 25/00* (2022.01)
*A61M 1/00* (2006.01)
(Continued)

(52) U.S. Cl.
CPC ........ *G01F 25/0092* (2013.01); *F04B 49/065* (2013.01); *F04B 2201/0206* (2013.01)

(58) Field of Classification Search
CPC ...... G01F 25/0092; G01F 1/74; F04B 49/065; F04B 2201/0206; A61M 2205/3334;
(Continued)

(56) References Cited

U.S. PATENT DOCUMENTS 5,194,145 A 3/1993 Schoendorfer
5,868,696 A 2/1999 Giesler et al.
(Continued)

FOREIGN PATENT DOCUMENTS

WO WO 2018/053217 A1 3/2018
WO WO-2023016955 A1 * 2/2023 .......... A61M 1/1668

OTHER PUBLICATIONS

Extended European Search Report dated Oct. 22, 2024 (Oct. 22, 2024) for EP 24185899.2.

*Primary Examiner* — Laura Martin Sweeney
*Assistant Examiner* — Anthony W Megna Fuentes
(74) *Attorney, Agent, or Firm* — Cook Alex Ltd.

(57) ABSTRACT

Systems and methods are provided for dynamic calibration and correction of the stroke volume of a pump. During a fluid processing procedure, the change in volume of a fluid in a container associated with a volume measurement system is calculated for a plurality of time periods. The standard deviation of the plurality of changes in volume is calculated, with it being determined that the volume measurement system is operating correctly when the standard deviation is below a target threshold. Upon determining that the volume measurement system is operating correctly, the stroke volume of the pump is calculated and a target change in volume of the fluid in the container is compared to an actual change in volume. When there is a difference between the two changes in volume, a correction factor is calculated, with the operation of the pump being adjusted based at least in part on the correction factor.

20 Claims, 3 Drawing Sheets

(51) Int. Cl.
*F04B 49/06* (2006.01)
*A61M 1/02* (2006.01)
*A61M 1/34* (2006.01)

(58) Field of Classification Search
CPC ...... A61M 2205/3396; A61M 2205/50; A61M 2205/702; A61M 1/00; A61M 1/0209; A61M 1/3496; A61M 2205/70; A61K 49/00; A61K 2123/00; A61K 2121/00
See application file for complete search history.

(56) References Cited

U.S. PATENT DOCUMENTS

| | | | | |
|---|---|---|---|---|
| 6,419,822 | B2 | 7/2002 | Muller et al. | |
| 8,556,793 | B2 | 10/2013 | Foley et al. | |
| 2021/0178051 | A1 * | 6/2021 | Kusters ............... | A61M 1/3621 |

* cited by examiner

DYNAMIC CALIBRATION AND CORRECTION OF STROKE VOLUME OF A PUMP

CROSS-REFERENCE TO RELATED APPLICATIONS

This application claims the benefit of and priority of U.S. Provisional Patent Application Ser. No. 63/525,005, filed Jul. 5, 2023, the contents of which are incorporated by reference herein.

BACKGROUND

Field of the Disclosure

The present subject matter relates to dynamically calibrating and correcting the stroke volume of a pump during use of the pump. More particularly, the present subject matter relates to use of signals from a volume measurement system to dynamically calibrate and correct the stroke volume of a pump during use of the pump.

Description of Related Art

Accurate flow rate is essential in any fluid processing procedure, such as an apheresis procedure in which blood is separated into two or more components, with one or more of the separated components (e.g., platelets) being collected into separate containers. Small volume errors over extended procedure lengths can result in large deviations in product volumes which may or not be acceptable to apheresis donation centers. One potential solution, involving weight scales, is to take snapshots of the weight of one or more fluid containers over a period of time and compare an actual change in weight to a target change in weight, with any difference between the two changes in weight being used to calculate and apply a correction factor that modifies the operation of one or more pumps of the apheresis device.

One potential issue with this approach is instability of the weight scale, which may be caused by high flow rates into and/or out of a container on the weight scale; environmental factors, such as instability of a surface on which a device is placed (e.g., a mobile bus collection site); or ventilation cross breezes, for example. While this can be resolved by pausing the procedure and ensuring that a container and its contents are stable, doing so has a disruptive impact on the procedure and increases the time required to complete it. To avoid disrupting a procedure, this process could be performed at the start of a procedure, before connecting to a container of previously collected fluid or phlebotomizing a donor (e.g., during a priming stage); however, since this only occurs one time before fluid processing begins, this approach cannot account for inaccuracies arising during fluid processing, which may be caused by a variety of occurrences (e.g., pump tubing or sheeting stretching or deforming). This stretching or deformation will lead to pump performance that necessitates a correction factor that is different from any correction factor that is calculated before fluid processing has begun, thus resulting in inaccurate results.

Another potential issue with this approach is that it is susceptible to bumps, which can affect weight scale readings and snapshots during a procedure, further decreasing the volume accuracy of the product relative to the target.

Additionally, if the calibration is being performed during a priming, the fluid is likely either saline or anticoagulant, which is not typically representative of the viscosity of the fluid being processed or its components, which may further impact the accuracy of the pump.

Yet another potential issue is the fact that the limited number of flow rates which can be performed to calculate a correction factor will not be representative of all of the potential flow rates which occur throughout the procedure.

Accordingly, it would be advantageous to provide a fluid processing device and procedure that are less vulnerable to weight scale and/or pump inaccuracies.

SUMMARY

There are several aspects of the present subject matter which may be embodied separately or together in the devices and methods described and claimed below. These aspects may be employed alone or in combination with other aspects of the subject matter described herein, and the description of these aspects together is not intended to preclude the use of these aspects separately or the claiming of such aspects separately as set forth in the claims appended hereto.

In one aspect, a fluid processing device includes a pump, a volume measurement system configured to be associated to a fluid container, and a controller programmed to control the operation of the pump and to receive a plurality of signals from the volume measurement system during a fluid processing procedure. Each signal is indicative of a volume of a fluid in the fluid container associated with the volume measurement system at a different time during the fluid processing procedure, with operation of the pump during the fluid processing procedure changing the volume of the fluid in the fluid container associated with the volume measurement system. The controller is further programmed to compare a pair of successive signals received from the volume measurement system during the fluid processing procedure to calculate a change in volume of the fluid in the fluid container associated with the volume measurement system during the time between receipt of the two successive signals. This is repeated for a plurality of pairs of successive signals so as to calculate the change in volume of the fluid in the fluid container associated with the volume measurement system for each pair of successive signals. The controller calculates a standard deviation of the plurality of changes in volume of the fluid in the fluid container associated with the volume measurement system, determining that the volume measurement system is operating correctly when the standard deviation is below a target threshold and determining that the volume measurement system is not operating correctly when the standard deviation is above the target threshold. Upon determining that the volume measurement system is operating correctly, the controller calculates a stroke volume of the pump, compares a target change in volume of the fluid in the fluid container associated with the volume measurement system to an actual change in volume of the fluid in the fluid container associated with the volume measurement system, and calculates a correction factor when there is a difference between the target change in volume and the actual change in volume. The controller then adjusts the operation of the pump based at least in part on the correction factor.

In another aspect, a method is provided for executing a fluid processing procedure. The method includes operating a pump so as to change a volume of a fluid in a fluid container associated with a volume measurement system. A plurality of signals are received from the volume measurement system during the fluid processing procedure, with each signal being indicative of the volume of the fluid in the fluid container associated with the volume measurement system at a different time during the fluid processing procedure. A pair of successive signals received from the volume measurement system are compared to calculate a change in volume of the fluid in the fluid container associated with the volume measurement system during the time between receipt of the two signals, with this being repeated for a plurality of pairs of successive signals so as to calculate the change in volume of the fluid in the fluid container associated with the volume measurement system for each pair of successive signals. A standard deviation of the plurality of changes in volume of the fluid in the fluid container associated with the volume measurement system is calculated, with it being determined that the volume measurement system is operating correctly when the standard deviation is below a target threshold and being determined that the volume measurement system is not operating correctly when the standard deviation is above the target threshold. Upon determining that the volume measurement system is operating correctly, a stroke volume of the pump is calculated and a target change in volume of the fluid in the fluid container associated with the volume measurement system is compared to an actual change in volume of the fluid in the fluid container associated with the volume measurement system. A correction factor is calculated when there is a difference between the target change in volume of the fluid in the fluid container associated with the volume measurement system and the actual change in volume of the fluid in the fluid container associated with the volume measurement system, with the operation of the pump being adjusted based at least in part on the correction factor.

DESCRIPTION OF THE ILLUSTRATED EMBODIMENTS

The embodiments disclosed herein are for the purpose of providing an exemplary description of the present subject matter. They are, however, only exemplary, and the present subject matter may be embodied in various forms. Therefore, specific details disclosed herein are not to be interpreted as limiting the subject matter as defined in the accompanying claims.

Figure 1:
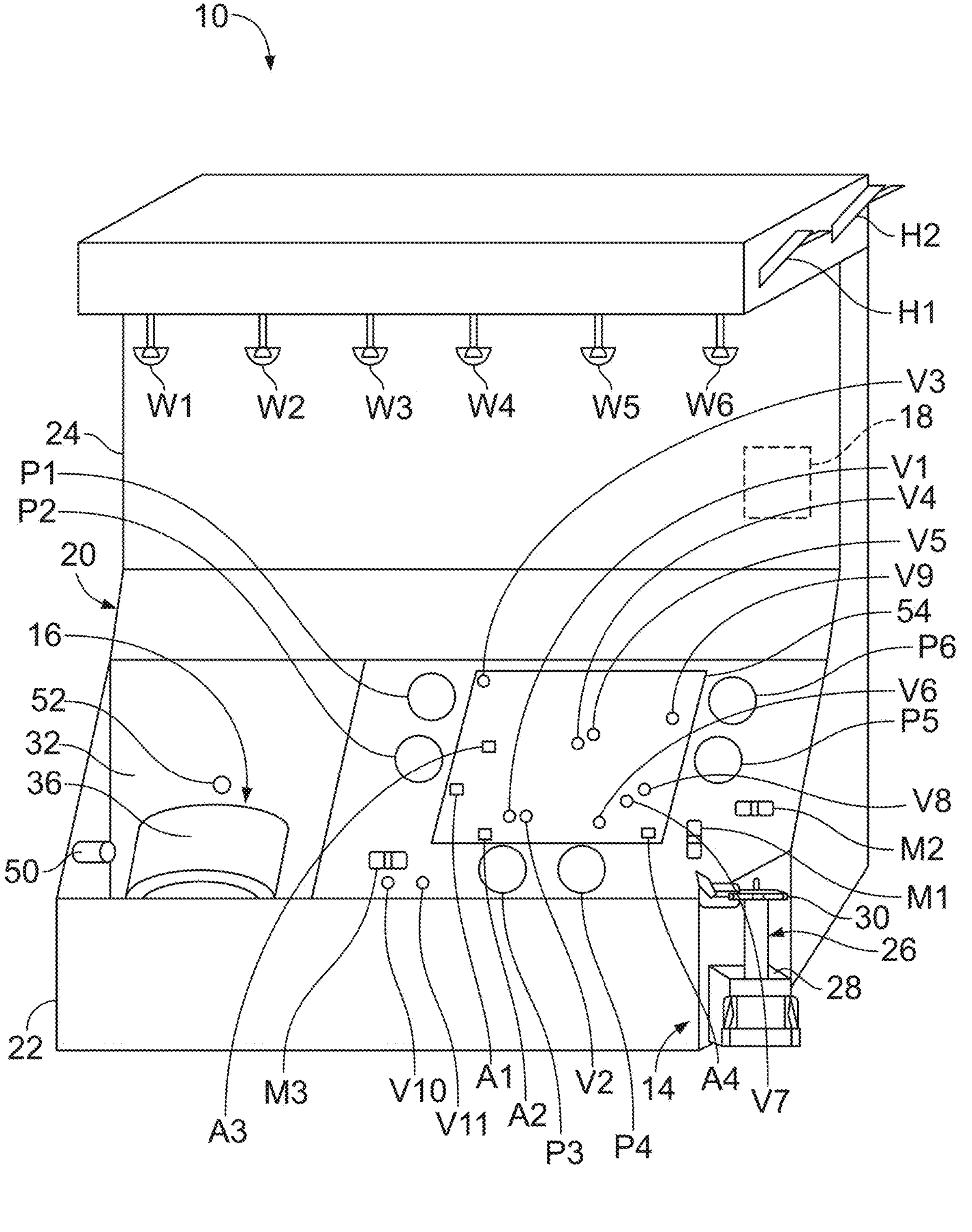
FIG. 1 is a perspective view of an exemplary fluid processing device that comprises a component of a fluid processing system according to an aspect of the present disclosure.
Figure 2:
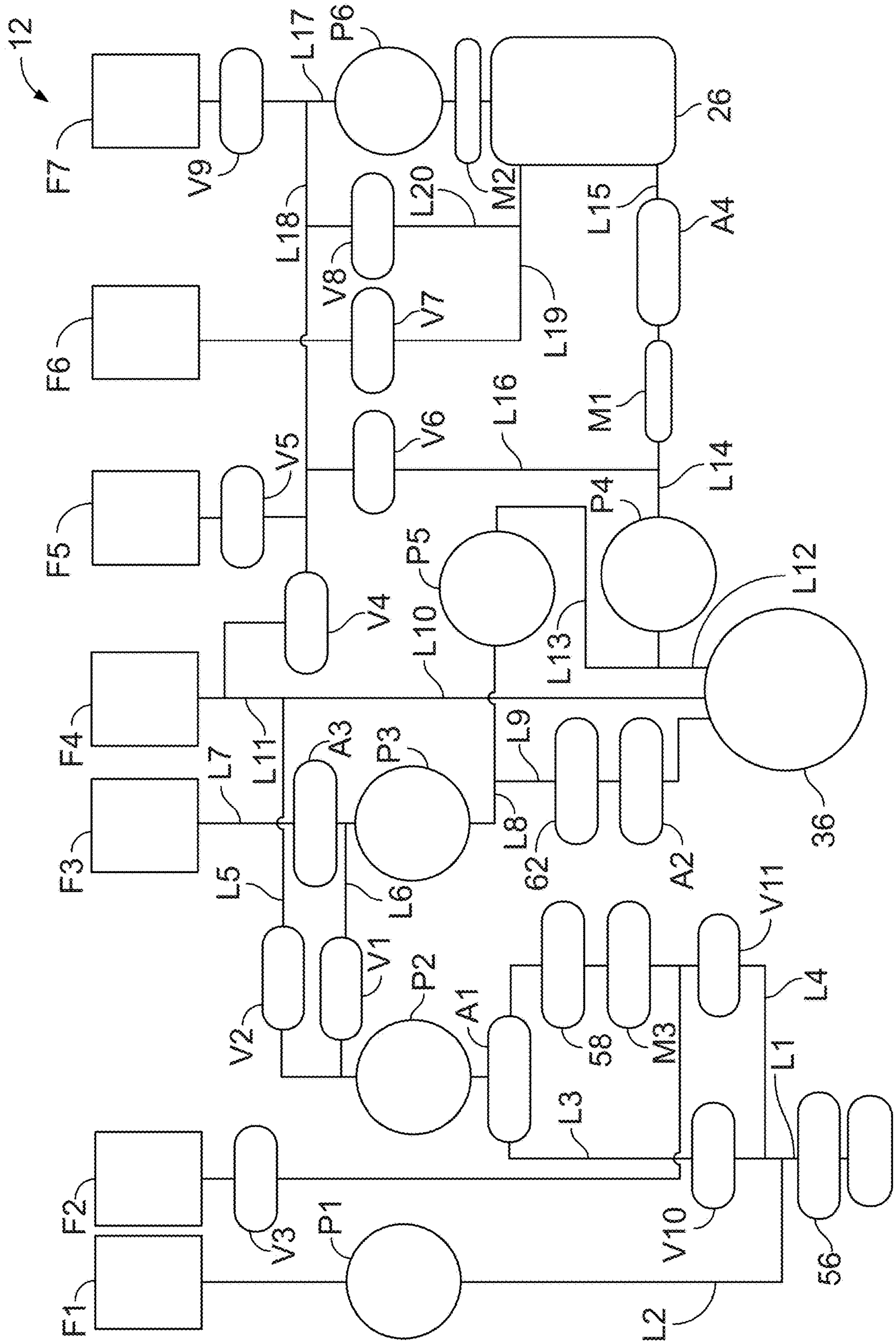
FIG. 2 is a schematic view of an exemplary disposable fluid flow circuit that may be mounted to the fluid processing device of FIG. 1 to complete a fluid processing system according to an aspect of the present disclosure.
Figure 3:
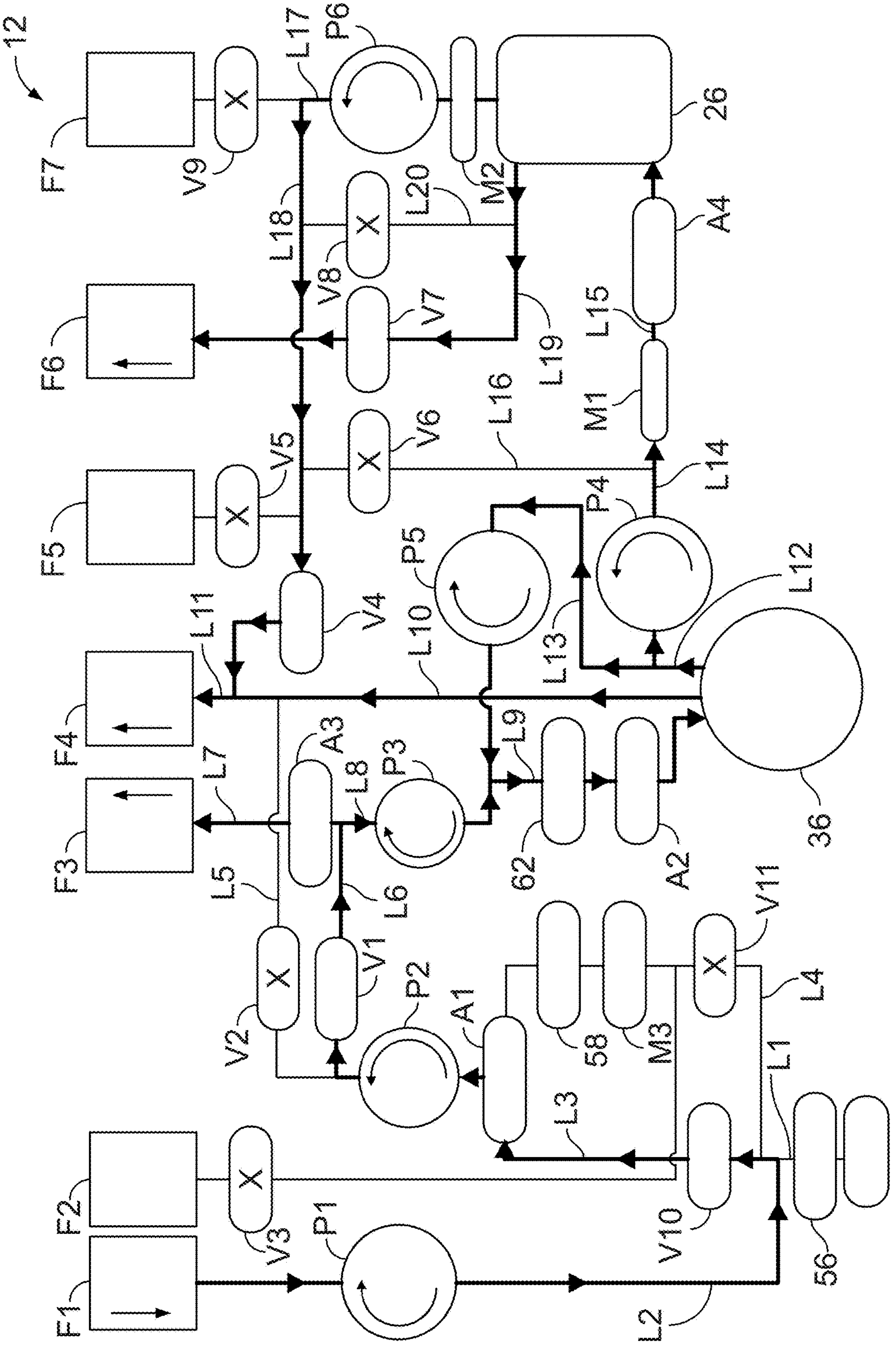
FIG. 3 is a schematic view of the fluid flow circuit of FIG. 2 mounted on the fluid processing device of FIG. 1, showing the system carrying out a fluid processing procedure.

FIGS. 1-3 show components of a fluid processing system that embodies various aspects of the present subject matter. Use of the system for separating blood into two or more components and collecting at least one of the components will be described herein, though it should be understood that systems according to the present disclosure can be used for processing a variety of fluids, which may include bodily fluids and non-bodily fluids.

Generally speaking, the system includes two principal components, a durable and reusable fluid processing device 10 (FIG. 1) and a disposable fluid flow circuit 12 (FIG. 2). The illustrated fluid processing device 10 includes a spinning membrane separator drive unit 14, a centrifuge or centrifugal separator 16, additional components that control fluid flow through the disposable flow circuit 12, and a controller 18, which governs the operation of the other components of the fluid processing device 10 to perform a fluid processing procedure. While the principles described herein may be employed when using the fluid processing device 10 of FIG. 1, it should be understood that these same principles may be applied to other fluid processing devices, including devices employing single separation technologies or approaches.

I. The Durable Fluid Processing Device

The fluid processing device 10 (FIG. 1) is configured as a durable item that is capable of long-term use. It should be understood that the fluid processing device 10 of FIG. 1 is merely exemplary of one possible configuration and that fluid processing devices according to the present disclosure may be differently configured.

In the illustrated embodiment, the fluid processing device 10 is embodied in a single housing or case 20. The illustrated case 20 includes a generally horizontal portion 22 (which may include an inclined or angled face or upper surface for enhanced visibility and ergonomics) and a generally vertical portion 24. The spinning membrane separator drive unit 14 and the centrifugal separator 16 are shown as being incorporated into the generally horizontal portion 22 of the case 20, while the controller 18 is shown as being incorporated into the generally vertical portion 24.

A. Spinning Membrane Separator Drive Unit

The fluid processing device 10 includes a spinner support or spinning membrane separator drive unit 14 for accommodating a generally cylindrical spinning membrane separator 26 of the fluid flow circuit 12. U.S. Pat. No. 5,194,145 (which is hereby incorporated herein by reference) describes an exemplary spinning membrane separator drive unit that would be suitable for incorporation into the fluid processing device 10, but it should be understood that the spinning membrane separator drive unit 14 may be differently configured without departing from the scope of the present disclosure.

The illustrated spinning membrane separator drive unit 14 has a base 28 configured to receive a lower portion of the spinning membrane separator 26 and an upper end cap 30 to receive an upper portion of the spinning membrane separator 26. Preferably, the upper end cap 30 is positioned directly above the base 28 to orient a spinning membrane separator 26 received by the spinning membrane separator drive unit 14 vertically and to define a vertical axis about which the spinning membrane separator 26 is spun. While it may be advantageous for the spinning membrane separator drive unit 14 to vertically orient a spinning membrane separator 26, it is also within the scope of the present disclosure for the spinning membrane separator 26 to be differently oriented when mounted to the fluid processing device 10.

In one embodiment, one of the base 28 and upper end cap 30 of the spinning membrane separator drive unit 14 is movable with respect to the other, which may allow differently sized spinning membrane separators 26 to be received by the spinning membrane separator drive unit 14. For example, the upper end cap 30 may be translated vertically with respect to the base 28 and locked in a plurality of different positions, with each locking position corresponding to a differently sized spinning membrane separator 26.

At least one of the base 28 and the upper end cap 30 is configured to spin one or more components of the spinning membrane separator 26 about the axis defined by the spinning membrane separator drive unit 14. The mechanism by which the spinning membrane separator drive unit 14 spins one or more components of the spinning membrane separator 26 may vary without departing from the scope of the present disclosure. In one embodiment, a component of the spinning membrane separator 26 to be spun includes at least one element configured to be acted upon by a magnet (e.g., a metallic material), while the spinning membrane separator drive unit 14 includes a magnet (e.g., a series of magnetic coils or semi-circular arcs). By modulating the magnetic field acting upon the aforementioned element of the spinning membrane separator 26, the component or components of the spinning membrane separator 26 may be made to spin in different directions and at varying speeds. In other embodiments, different mechanisms may be employed to spin the component or components of the spinning membrane separator 26.

Regardless of the mechanism by which the spinning membrane separator drive unit 14 spins the component or components of the spinning membrane separator 26, the component or components of the spinning membrane separator 26 is/are preferably spun at a speed that is sufficient to create Taylor vortices in a gap between the spinning component and a stationary component of the spinning membrane separator 26 (or a component that spins at a different speed). Fluid to be separated within the spinning membrane separator 26 flows through this gap, and filtration may be dramatically improved by the creation of Taylor vortices.

B. Centrifugal Separator

As for the centrifugal separator 16, it includes a centrifuge compartment 32 that receives a centrifugal separation chamber 36 of the fluid flow circuit 12, as well as other components of the centrifugal separator 16. Further details as to the centrifugal separator are set forth in PCT Patent Application Publication No. WO 2018/053217 A1, which is hereby incorporated herein by reference.

Fluid (e.g., anticoagulated whole blood) is introduced into the centrifugal separation chamber 36 by an umbilicus, with the fluid being separated into a layer of less dense components (e.g., platelet-rich plasma, in the case of blood being separated) and a layer of more dense components (e.g., packed red blood cells) within the centrifugal separation chamber 36 as a result of centrifugal forces as it rotates. Components of an interface monitoring system may be positioned within the centrifuge compartment 32 to oversee separation of fluid within the centrifugal separation chamber 36. The interface monitoring system may include a light source 50 and a light detector 52, which is positioned and oriented to receive at least a portion of the light emitted by the light source 50.

The orientation of the various components of the interface monitoring system depends at least in part on the particular configuration of the centrifugal separation chamber 36. In general, though, the light source 50 emits a light beam (e.g., a laser light beam) through the separated fluid components within the centrifugal separation chamber 36 (which may be formed of a material that substantially transmits the light or at least a particular wavelength of the light without absorbing it). A portion of the light reaches the light detector 52, which transmits a signal to the controller 18 that is indicative of the location of an interface between the separated fluid components. If the controller 18 determines that the interface is in the wrong location (which can affect the separation efficiency of the centrifugal separator 16 and/or the quality of the separated fluid components), then it can issue commands to the appropriate components of the fluid processing device 10 to modify their operation so as to move the interface to the proper location.

C. Other Components of the Fluid Processing Device

In addition to the spinning membrane separator drive unit 14 and the centrifugal separator 16, the fluid processing device 10 may include other components compactly arranged to aid fluid processing.

The generally horizontal portion 22 of the case 20 of the illustrated fluid processing device 10 includes a cassette station 54, which accommodates a flow control cassette of the fluid flow circuit 12. In one embodiment, the cassette station 54 is similarly configured to the cassette station of U.S. Pat. No. 5,868,696 (which is hereby incorporated herein by reference), but is adapted to include additional components and functionality. The illustrated cassette station 54 includes a plurality of clamps or valves V1-V9, which move between a plurality of positions (e.g., between a retracted or lowered position and an actuated or raised position) to selectively contact or otherwise interact with corresponding valve stations of the flow control cassette of the fluid flow circuit 12. Depending on the configuration of the fluid flow circuit 12, its cassette may not include a valve station for each valve V1-V9 of the cassette station 54, in which case fewer than all of the valves V1-V9 will be used in a fluid processing procedure.

In the actuated position, a valve V1-V9 engages the associated valve station to prevent fluid flow through that valve station (e.g., by closing one or more ports associated with the valve station, thereby preventing fluid flow through that port or ports). In the retracted position, a valve V1-V9 is disengaged from the associated valve station (or less forcefully contacts the associated valve station than when in the actuated position) to allow fluid flow through that valve station (e.g., by opening one or more ports associated with the valve station, thereby allowing fluid flow through that port or ports). Additional clamps or valves V10 and V11 may be positioned outside of the cassette station 54 to interact with portions of valve stations (which may be lengths of tubing) of the fluid flow circuit 12 to selectively allow and prevent fluid flow therethrough. The valves V1-V9 and corresponding valve stations of the cassette station 54 and cassette may be differently configured and operate differently from the valves V10 and V11 and the valve stations that are spaced away from the cassette station 54.

The cassette station 54 may be provided with additional components, such as pressure sensors A1-A4, which interact with sensor stations of the cassette to monitor the pressure at various locations of the fluid flow circuit 12. For example, if the fluid source is a human donor, one or more of the pressure sensors A1-A4 may be configured to monitor the pressure of the donor's vein during blood draw and return. Other pressure sensors A1-A4 may monitor the pressure of the spinning membrane separator 26 and the centrifugal separation chamber 36. The controller 18 may receive signals from the pressure sensors A1-A4 that are indicative of the pressure within the fluid flow circuit 12 and, if a signal indicates a low- or high-pressure condition, the controller 18 may initiate an alarm or error condition to alert an operator to the condition and/or to attempt to bring the pressure to an acceptable level without operator intervention.

The fluid processing device 10 may also include a plurality of pumps P1-P6 to cause fluid to flow through the fluid flow circuit 12. The pumps P1-P6 may be differently or similarly configured and/or function similarly or differently from each other. In the illustrated embodiment, the pumps P1-P6 are configured as peristaltic pumps, which may be generally configured as described in U.S. Pat. No. 5,868,696. Each pump P1-P6 engages a different tubing loop extending from a side surface of the flow control cassette and may be selectively operated under command of the controller 18 to cause fluid to flow through a portion of the fluid flow circuit 12. In one embodiment, all or a portion of the cassette station 54 may be capable of translational motion in and out of the case 20 to allow for automatic loading of the tubing loops into the associated pump P1-P6. In another exemplary embodiment, rather than employing peristaltic pumps, pneumatic pumps may be employed, with actuators incorporated into the cassette station 54 interacting with suitably configured portions of the fluid flow circuit 12 (e.g., pump stations of a cassette mounted to the cassette station 54) to convey fluid through the fluid flow circuit 12.

The illustrated fluid processing device 10 also includes a spinner inlet sensor M1 for determining one or more properties of a fluid flowing into a spinning membrane separator 26 mounted within the spinning membrane separator drive unit 14. If the fluid flowing into the spinning membrane separator 26 is whole blood (which may include anticoagulated whole blood), the spinner inlet sensor M1 may be configured to determine the hematocrit of the blood flowing into the spinning membrane separator 26. If the fluid flowing into the spinning membrane separator 26 is platelet-rich plasma, the spinner inlet sensor M1 may be configured to determine the platelet concentration of platelet-rich plasma flowing into the spinning membrane separator 26. The spinner inlet sensor M1 may detect the one or more properties of a fluid by optically monitoring the fluid as it flows through tubing of the fluid flow circuit 12, or by any other suitable approach. The controller 18 may receive signals from the spinner inlet sensor M1 that are indicative of the one or more properties of fluid flowing into the spinning membrane separator 26 and use the signals to optimize the fluid processing procedure based upon that property or properties. If the property or properties is/are outside of an acceptable range, then the controller 18 may initiate an alarm or error condition to alert an operator to the condition. A suitable device and method for monitoring hematocrit and/or platelet concentration is described in U.S. Pat. No. 6,419,822 (which is hereby incorporated herein by reference), but it should be understood that a different approach may also be employed for monitoring one or more properties of a fluid or fluid component flowing into the spinning membrane separator 26.

The illustrated fluid processing device 10 further includes a spinner outlet sensor M2, which accommodates tubing of the fluid flow circuit 12 that flows a separated fluid component out of the spinning membrane separator 26. The spinner outlet sensor M2 monitors the separated fluid component to determine one or more properties thereof, and may do so by optically monitoring the separated fluid component as it flows through the tubing or by any other suitable approach. In one embodiment, separated plasma flows through the tubing, in which case the spinner outlet sensor M2 may be configured to determine the amount of cellular blood components in the plasma and/or whether the plasma is hemolytic and/or lipemic. This may be done using an optical monitor of the type described in U.S. Pat. No. 8,556,793 (which is hereby incorporated herein by reference) that measures the optical density of the fluid in the associated tubing, or by any other suitable device and/or method.

The illustrated fluid processing device also includes an air detector M3 (e.g., an ultrasonic bubble detector), which accommodates tubing of the fluid flow circuit 12 that flows fluid to a recipient. It may be advantageous to prevent air from reaching the recipient, whether a human recipient (e.g., the same human that serves as the blood source) or a non-human recipient (e.g., a storage bag or container), so the air detector M3 may transmit signals to the controller 18 that are indicative of the presence or absence of air in the tubing. If the signal is indicative of air being present in the tubing, the controller 18 may initiate an alarm or error condition to alert an operator to the condition and/or to take corrective action to prevent the air from reaching the recipient (e.g., by reversing the flow of fluid through the tubing or diverting flow to a vent location).

The generally vertical portion 24 of the case 20 may include a plurality of volume measurement systems W1-W6 (six are shown, but more or fewer may be provided), each configured to be associated with one or more fluid containers F1-F7 of the fluid flow circuit 12 (FIGS. 2 and 3). Each volume measurement system W1-W6 is configured to work in combination with the controller 18 to measure a current volume of fluid within an associated fluid container F1-F7 and to calculate a change in that volume between two or more points in time. The individual volume measurement systems W1-W6 may be variously configured without departing from the scope of the present disclosure, which may include two or more of the volume measurement systems W1-W6 being differently configured. In one exemplary embodiment, a volume measurement system W1-W6 may be configured as or include a weight scale configured to support and measure the weight of a fluid within an associated fluid container F1-F7 (with the measured weight being converted to a volume by a component of the volume measurement system W1-W6 or by the controller 18). In another exemplary embodiment, a volume measurement system W1-W6 may include one or more sensors configured to detect a volume and/or a change in volume of a fluid within an associated fluid container F1-F7. Volume measurement systems including additional components (e.g., both a weight scale and a sensor) and/or alternative components may also be employed without departing from the scope of the present disclosure.

Regardless of its particular configuration, each volume measurement system W1-W6 transmits to the controller 18 a signal that is indicative of the volume of the fluid within the associated container F1-F7 to track the change of volume during the course of a procedure. This allows the controller 18 to process the incremental volume changes to derive fluid processing volumes and flow rates and subsequently generate signals to control processing events based, at least in part, upon the derived processing volumes. For example, the controller 18 may diagnose leaks and obstructions in the fluid flow circuit 12 and alert an operator.

The illustrated case 20 is also provided with a plurality of hooks or supports H1 and H2 that may support various components of the fluid flow circuit 12 or other suitably sized and configured objects.

D. Controller

According to an aspect of the present disclosure, the fluid processing device 10 includes a controller 18, which is suitably configured and/or programmed to control operation of the fluid processing device 10. In one embodiment, the controller 18 comprises a main processing unit (MPU), which can comprise, e.g., a Pentium™ type microprocessor made by Intel Corporation, although other types of conventional microprocessors can be used. In one embodiment, the controller 18 may be mounted inside the generally vertical portion 24 of the case 20, adjacent to or incorporated into an operator interface station (e.g., a touchscreen). In other embodiments, the controller 18 and operator interface station may be associated with the generally horizontal portion 22 or may be incorporated into a separate device that is connected (either physically, by a cable or the like, or wirelessly) to the fluid processing device 10.

The controller 18 is configured and/or programmed to execute at least one fluid processing procedure but, more advantageously, is configured and/or programmed to execute a variety of different fluid processing procedures. For example, the controller 18 may be configured and/or programmed to carry out one or more of the following: a double unit red blood cell collection procedure, a plasma collection procedure, a plasma/red blood cell collection procedure, a red blood cell/platelet/plasma collection procedure, a platelet collection procedure, and a platelet/plasma collection procedure.

More particularly, in carrying out these fluid processing procedures, the controller 18 is configured and/or programmed to control one or more of the following tasks: drawing fluid into a fluid flow circuit 12 mounted to the fluid processing device 10, conveying fluid through the fluid flow circuit 12 to a location for separation (i.e., into a spinning membrane separator 26 or centrifugal separation chamber 36 of the fluid flow circuit 12), separating the fluid into two or more components as desired, and conveying the separated components into storage containers, to a second location for further separation (e.g., into whichever of the spinning membrane separator 26 and centrifugal separation chamber 36 that was not used in the initial separation stage), or to a recipient (which may be a source from which the fluid was originally drawn).

This may include instructing the spinning membrane separator drive unit 14 and/or the centrifugal separator 16 to operate at a particular rotational speed and instructing a pump P1-P6 to convey fluid through a portion of the fluid flow circuit 12 at a particular flow rate. Hence, while it may be described herein that a particular component of the fluid processing device 10 (e.g., the spinning membrane separator drive unit 14 or the centrifugal separator 16) performs a particular function, it should be understood that that component is being controlled by the controller 18 to perform that function.

Before, during, and after a procedure, the controller 18 may receive signals from various components of the fluid processing device 10 (e.g., the pressure sensors A1-A4) to monitor various aspects of the operation of the fluid processing device 10 and characteristics of the fluid and separated fluid components as they flow through the fluid flow circuit 12. If the operation of any of the components and/or one or more characteristics of the fluid or separated fluid components is outside of an acceptable range, then the controller 18 may initiate an alarm or error condition to alert the operator and/or take action to attempt to correct the condition. The appropriate corrective action will depend upon the particular error condition and may include action that is carried out with or without the involvement of an operator.

For example, the controller 18 may include an interface control module, which receives signals from the light detector 52 of the interface monitoring system. The signals that the controller 18 receives from the light detector 52 are indicative of the location of an interface between the separated fluid components within the centrifugal separation chamber 36. If the controller 18 determines that the interface is in the wrong location, then it can issue commands to the appropriate components of the fluid processing device 10 to modify their operation so as to move the interface to the proper location. For example, the controller 18 may instruct one of the pumps P1-P6 to cause fluid to flow into the centrifugal separation chamber 36 at a different rate and/or for a separated fluid component to be removed from the centrifugal separation chamber 36 at a different rate and/or for the centrifugal separation chamber 36 to be spun at a different speed by the centrifugal separator 16.

If provided, an operator interface station associated with the controller 18 allows the operator to view on a screen or display (in alpha-numeric format and/or as graphical images) information regarding the operation of the system. The operator interface station also allows the operator to select applications to be executed by the controller 18, as well as to change certain functions and performance criteria of the system. If configured as a touchscreen, the screen of the operator interface station can receive input from an operator via touch-activation. Otherwise, if the screen is not a touchscreen, then the operator interface station may receive input from an operator via a separate input device, such as a computer mouse or keyboard. It is also within the scope of the present disclosure for the operator interface station to receive input from both a touchscreen and a separate input device, such as a keypad.

II. The Disposable Fluid Flow Circuit

As for the fluid flow circuit or flow set 12 (FIGS. 2 and 3), it is intended to be a sterile, single use, disposable item. Before beginning a given fluid processing procedure, the operator loads various components of the fluid flow circuit 12 in the case 20 in association with the fluid processing device 10. The controller 18 implements the procedure based upon preset protocols, taking into account other input from the operator. Upon completing the procedure, the operator removes the fluid flow circuit 12 from association with the fluid processing device 10. The portions of the fluid flow circuit 12 holding the collected fluid component or components (e.g., collection containers or bags) are removed from the case 20 and retained for storage, transfusion, or further processing. The remainder of the fluid flow circuit 12 is removed from the case 20 and discarded.

In the illustrated embodiment, the fluid flow circuit 12 includes a cassette, to which the other components of the fluid flow circuit 12 are connected by flexible tubing. The other components may include a plurality of fluid containers F1-F7. In the context of the present disclosure these containers include an anticoagulant container F1, a saline container F2, an in-process container F3, a return container F4, a plasma collection container F5, a platelet collection container F6, and an (optional) additive container F7. The illustrated flow circuit 12 further includes one or more fluid source access devices (e.g., a connector for accessing blood within a fluid container or a phlebotomy needle), a spinning membrane separator 26 and a centrifugal separation chamber 36.

The flow control cassette provides a centralized, programmable, integrated platform for all the pumping and many of the valving functions required for a given fluid processing procedure. In one embodiment, the cassette is similarly configured to the cassette of U.S. Pat. No. 5,868,696, but is adapted to include additional components (e.g., more tubing loops) and functionality.

In use, the cassette is mounted to the cassette station 54 of the fluid processing device 10 so as to align each sensor station with an associated pressure sensor A1-A4 of the cassette station 54 and its valve stations with an associated valve V1-V9. Each valve station may define one or more ports that allow fluid communication between the valve station and another interior cavity of the cassette (e.g., a flow path). As described above, each valve V1-V9 is movable under command of the controller 18 to move between a plurality of positions (e.g., between a retracted or lowered position and an actuated or raised position) to selectively contact the valve stations of the cassette. In the actuated position, a valve V1-V9 engages the associated valve station to close one or more of its ports to prevent fluid flow therethrough. In the retracted position, a valve V1-V9 is disengaged from the associated valve station (or less forcefully contacts the associated valve station than when in the actuated position) to open one or more ports associated with the valve station, thereby allowing fluid flow therethrough.

A plurality of tubing loops extend from the side surface of the cassette to interact with pumps P1-P6 of the fluid processing device 10. The different pumps P1-P6 may interact with the tubing loops of the cassette to perform different tasks during a procedure, but in the context of the present disclosure, a different one of the pumps P1-P6 may be configured to serve as an anticoagulant pump P1, a source pump P2, a centrifuge pump P3, an outlet pump P4, a recirculation pump P5, and a plasma pump P6. If the pumps P1-P6 are differently configured (e.g., if they are configured as pneumatic pumps), then the cassette may be differently configured (e.g., with pump stations aligned with pneumatic pump actuators) to allow for the pumps P1-P6 to convey fluid through the cassette.

Additional tubing extends from the side surface of the cassette to connect to the other components of the fluid flow circuit 12, such as the various fluid containers F1-F7, the spinning membrane separator 26, and the centrifugal separation chamber 36. The tubing connected to the centrifugal separator chamber 36 (which includes one inlet tube and two outlet tubes) may be aggregated into an umbilicus.

Various additional components may be incorporated into the tubing leading out of the cassette or into one of the cavities of the cassette. For example, a manual clamp 56 may be associated with a line or lines leading to the fluid source, a return line filter 58 (e.g., a microaggregate filter) may be associated with a line leading to a fluid recipient, and/or an air trap 62 may be positioned on a line upstream of the centrifugal separation chamber 36.

III. Exemplary Fluid Processing Procedure

An exemplary fluid processing procedure according to the present disclosure will now be described. In the exemplary procedure, blood is separated via centrifugation into packed red blood cells and platelet-rich plasma, with a portion of the platelet-rich plasma being recirculated back through a centrifugal separation chamber and another portion being separated into platelet concentrate and platelet-poor plasma until a target volume of platelets has been collected. It should be understood that the below-described procedure is merely exemplary and that the principles described herein may be practiced in combination with other fluid processing procedures (e.g., procedures in which platelet-poor plasma is recirculated through a centrifugal separation chamber during blood separation) without departing from the scope of the present disclosure.

Prior to processing, an operator selects the desired protocol (e.g., using an operator interface station, if provided), which informs the controller 18 of the manner in which it is to control the other components of the fluid processing device 10 during the procedure. This may include first selecting one of a plurality of possible procedures that the system is capable of executing and then, after selecting the nature of the procedure, selecting one or more parameters to be in effect during the procedure. For example, this may include selecting a platelet collection procedure from among a variety of blood separation procedures and then selecting a total volume of blood to be processed or a target volume of platelets to be collected during the procedure. If the fluid source is a living source (e.g., a donor or patient), the operator may proceed to enter various parameters, such as the sex/height/weight of the source. In one embodiment, the operator may also enter one or more characteristics of the fluid to be processed, such as a platelet pre-count.

If there are any fluid containers (e.g., a platelet additive solution container) that are not integrally formed with the fluid flow circuit 12, they may be connected to the fluid flow circuit 12 (e.g., by piercing a septum of a tube of the fluid flow circuit 12 or via a luer connector), with the fluid flow circuit 12 then being mounted to the fluid processing device 10 (including the fluid containers F1-F7 being associated with the volume measurement systems W1-W6, as appropriate). In one exemplary embodiment, each volume measurement system W1-W6 includes a weight scale associated with a hook from which a fluid container may be hung. In another exemplary embodiment, at least one of the volume measurement systems W1-W6 includes a weight scale associated with a horizontal platform or surface, with a container being placed onto the platform or surface for support while the weight scale sends signals indicative of the weight of the container (and its contents) to be sent to the controller 18 throughout the course of a procedure. In other embodiments, a fluid container may be associated with a volume measurement system omitting a weight scale, but including other means for measuring the volume of fluid within the container (e.g., one or more sensors).

An integrity check of the fluid flow circuit 12 may be executed by the controller 18 to ensure that the various components are properly connected and functioning. Following a successful integrity check, the fluid source is connected to the fluid flow circuit 12 (e.g., by connecting to a container of previously collected fluid or by phlebotomizing a donor), and the fluid flow circuit 12 may be primed (e.g., using saline pumped from a saline container F2 by operation of one or more of the pumps P1-P6 of the fluid processing device 10).

After the fluid flow circuit 12 has been primed, fluid processing may begin. In a first phase of an exemplary platelet collection procedure (FIG. 3), blood is drawn into the fluid flow circuit 12 from a blood source. If the blood source is a donor, then blood may be drawn into the fluid flow circuit 12 through a single needle that is connected to the cassette by line L1. Line L1 may include a manual clamp 56 that may initially be in a closed position to prevent fluid flow through line L1. When processing is to begin, an operator may move the manual clamp 56 from its closed position to an open position to allow fluid flow through line L1.

The blood is drawn into line L1 by the source pump P2 of the fluid processing device 10. Anticoagulant from the anticoagulant container F1 may be drawn through line L2 under action of the anticoagulant pump P1 and added to the blood at a junction of lines L1 and L2.

In the illustrated embodiment, valve V10 is open to allow anticoagulated blood to flow through line L3 and a cassette sensor station associated with pressure sensor A1, while valve V11 is closed to prevent fluid flow through line L4. If the blood source is a living body (e.g., a donor), the pressure sensor A1 may communicate with the controller 18 to monitor the pressure within the vein of the blood source.

The cassette includes two valve stations downstream of the source pump P2, with valve V2 being closed to prevent flow through line L5 and valve V1 being open to allow flow through line L6. A portion of the blood is directed through line L7 and a cassette sensor station associated with pressure sensor A3 to the in-process container F3 and the remainder is directed through line L8 toward the centrifuge pump P3, which controls the amount of blood that is directed to the centrifugal separation chamber 36 instead of the in-process container F3. In particular, the flow rate of the source pump P2 is greater than the flow rate of the centrifuge pump P3, with the difference therebetween being equal to the flow rate of blood into the in-process container F3. The flow rates may be selected such that the in-process container F3 is partially or entirely filled with blood at the end of the draw phase.

The blood pumped through line L8 by the centrifuge pump P3 passes through line L19, an air trap 62, and a cassette sensor station associated with pressure sensor A2 (which works in combination with the controller 18 of the fluid processing device 10 to monitor the pressure in the centrifugal separation chamber 36) before reaching the centrifugal separation chamber 36 of the fluid flow circuit 12. The centrifugal separator 16 of the fluid processing device 10 manipulates the centrifugal separation chamber 36 to separate the blood in the centrifugal separation chamber 36 into platelet-rich plasma and packed red blood cells. In one embodiment, the centrifugal separation chamber 36 is rotated nominally at 4,500 rpm, but the particular rotational speed may vary depending on the flow rates of fluids into and out of the centrifugal separation chamber 36.

The packed red blood cells exit the centrifugal separation chamber 36 via line L10 and flow through line L11 into the return container F4. Platelet-rich plasma is drawn out of the centrifugal separation chamber 36 via line L12 by the combined operation of the recirculation and outlet pumps P5 and P4 of the fluid processing device 10. The platelet-rich plasma travels through line L12 until it reaches a junction, which splits into lines L13 and L14. The recirculation pump P5 is associated with line L13 and redirects a portion of the platelet-rich plasma to a junction, where it mixes with blood in line L8 that is being conveyed into the centrifugal separation chamber 36 by the centrifuge pump P3. Recirculating a portion of the platelet-rich plasma into the centrifugal separation chamber 36 with inflowing blood decreases the hematocrit of the blood entering the centrifugal separation chamber 36, which may improve separation efficiency. By such an arrangement, the flow rate of the fluid entering the centrifugal separation chamber 36 is equal to the sum of the flow rates of the centrifuge pump P3 and the recirculation pump P5. As the platelet-rich plasma drawn out of the centrifugal separation chamber 36 into line L13 by the recirculation pump P5 is immediately added back into the centrifugal separation chamber 36, the bulk or net platelet-rich plasma flow rate out of the centrifugal separation chamber 36 is equal to the flow rate of the outlet pump P4.

Line L14 ends at a junction, where it joins with lines L15 and L16. Valve V6 is closed to prevent fluid flow through line L16, thereby directing the separated platelet-rich plasma to the spinning membrane separator 26 via line L15. Before reaching the spinning membrane separator 26, the portion of the platelet-rich plasma conveyed through line L15 passes the spinner inlet sensor M1 and a cassette sensor station associated with pressure sensor A4. The spinner inlet sensor M1 may detect the concentration of platelets in the platelet-rich plasma entering the spinning membrane separator 26, while the pressure sensor A4 may monitor the pressure of the spinning membrane separator 26.

While valve V6 is shown in FIG. 3 as being closed, it may be selectively opened to divert all or a portion of the platelet-rich plasma from line L14 into and through line L16 and to the return container F4, if necessary. An example would be at the start of a procedure when separation is initializing and platelets are not yet exiting the centrifugal separation chamber 36, in which case the fluid conveyed through line L14 by the outlet pump P4 could be diverted to the return container F4.

The spinning membrane separator drive unit 14 of the fluid processing device 10 manipulates the spinning membrane separator 26 to separate the platelet-rich plasma into platelet-poor plasma ("plasma") and platelet concentrate ("platelets"). Plasma is pumped out of the spinning membrane separator 26 via line L17 by the plasma pump P6 of the fluid processing device 10. Valves V5, V6, V8, and V9 are closed to direct the separated plasma along line L18, through valve V4, and into the return container F4 (with the separated red blood cells). On the way to the return container F4, the plasma passes through spinner outlet sensor M2, which may cooperate with the controller 18 to determine one or more characteristics of the plasma, such as the amount of cellular blood components in the plasma and/or whether the plasma is hemolytic and/or lipemic.

The platelet concentrate is conveyed out of the spinning membrane separator 26 via line L19. There is no pump associated with line L19, so instead the flow rate at which the platelets exit the spinning membrane separator 26 is equal to the difference between the flow rates of the outlet pump P4 and plasma pump P6. Valve V8 is closed to prevent fluid flow through the line L20, thereby directing the flow of platelets along line L19, through valve V7, and into the platelet collection container F6. Valve V8 may be selectively opened to allow fluid flow through line L20 and to a junction, where it joins the plasma flowing through line L18 to the return container F4, if necessary.

Depending on the volume of platelets to be collected, the draw stage of FIG. 3 may be repeated, with draw stages being alternated with return stages in which blood from the in-process container F3 is separated in the centrifugal separation chamber 36 while previously collected blood components in the return container F4 are returned to the blood source. During such return stages, the separated red blood cells and platelet-rich plasma may be variously routed through the fluid flow circuit 12, typically with an additional volume of platelets being collected in the platelet collection container F6 after being separated from platelet-poor plasma in the spinning membrane separator 26 (as during the draw stage of FIG. 3). A platelet additive solution from the additive container F7 may be added to the collected platelets in the platelet collection container F6 before ending the procedure.

Throughout the course of the procedure, the controller 18 receives signals from the volume measurement system associated with the platelet collection container F6 to calculate the volume or yield of platelets collected as the procedure continues. When a target volume of platelets has been collected, the procedure may conclude. In addition to receiving signals from the volume measurement system associated with the platelet collection container F6, the controller 18 may also receive signals from the volume measurement systems associated with any of the other containers to track the change in the volume of fluid in each container throughout the course of the procedure. This may include the controller 18 receiving signals from the volume measurement system associated with the anticoagulant container F1, from the volume measurement system associated with the saline container F2, from the volume measurement system associated with the in-process container F3, from the volume measurement system associated with the return container F4, from the volume measurement system associated with the plasma collection container F5, and/or from the volume measurement system associated with the additive container F7.

As described above, proper operation of the pumps and volume measurement systems of the fluid processing device 10 is important to ensure that a selected fluid processing procedure proceeds as intended. To that end, the controller 18 is programmed to execute a protocol by which the operation of the pumps and volume measurement systems is monitored and, as necessary, corrected. During the course of a fluid processing procedure, the controller 18 receives periodic signals from one or more of the volume measurement systems W1-W6. The controller 18 compares successive signals from a given volume measurement system to determine the change in volume of a fluid container and its contents during the time period between the two signals. For example, when a volume measurement system includes a weight scale, the controller 18 may use the change in weight of the fluid container and its contents to calculate a change in volume of the contents of the fluid container during the time period between the two signals.

The change in volume of the contents of the fluid container during the time period between the two signals may be correlated (by the controller 18) to the stroke volume of the pump or pumps that operate to increase or decrease the volume of the contents of the fluid container during that same time period. For example, in the stage of the fluid processing procedure shown in FIG. 3, the change in the volume of the contents of the anticoagulant container F1 may be directly correlated to the stroke volume of the anticoagulant pump P1 because pump P1 is solely responsible for drawing anticoagulant from the anticoagulant container F1. During the stage shown in FIG. 3, valve V3 is closed, thus preventing flow into or out of the saline container F2 but, during other stages (e.g., a priming stage), valve V3 will be open to allow saline to be drawn from the saline container F2 upon operation of one or more pumps. Typically, the source pump P2 is used to draw saline from the saline container F2, such that the operation of the volume measurement system associated with the saline container F2 and the operation of the source pump P2 may be assessed together, with the change in volume of the contents of the saline container F2 being directly correlated to the stroke volume of the source pump P2. As shown in FIG. 3, the source pump P2 will be active at other times during the course of a procedure, such that its operation may be assessed in combination with the operation of other volume measurement systems. For example, during the stage shown in FIG. 3, the source pump P2 operates to convey anticoagulated whole blood into the in-process container F3, such that the change in volume of the contents of the in-process container F3 during the illustrated stage may be correlated to the stroke volume of the source pump P2.

As for the centrifuge pump P3, its operation may be correlated to a change in volume of the contents of the return container F4 during the stage shown in FIG. 3, though it will be seen that the operation of other pumps (including the plasma pump P6) contributes to the change in volume of the contents of the return container F4 during the illustrated stage. Thus, if the controller 18 is programmed to assess the operation of the volume measurement system associated with the return container F4 and the operation of the centrifuge pump P3 during the stage shown in FIG. 3, it must account for the operation of at least one other pump rather than being able to directly correlate the operation of the volume measurement system to the operation of a single pump or the operation of the centrifuge pump P3 to the operation of a single volume measurement system. In other stages of a procedure, the operation of the volume measurement systems associated with the return container F4 may be directly correlated to the operation of a single pump (which may or may not be the centrifuge pump P3) and/or the operation of the centrifuge pump P3 may be directly correlated to the operation of a single volume measurement system (which may or may not be the volume measurement system associated with the return container F4), in which case the controller 18 may be better able to isolate the operation of the volume measurement system and/or centrifuge pump P3. Indeed, it should be understood that the operation of a volume measurement system may be assessed in combination with different pumps during different stages of a fluid processing procedure (or even during a single stage) and that the operation of a pump may be assessed in combination with different volume measurement systems during different stages of a fluid processing procedure (or even during a single stage).

As for the other pumps P4-P6 and the volume measurement systems associated with the other fluid containers F5-F7, their operation may be similarly assessed throughout the course of a fluid processing procedure. For example, if the stage of FIG. 3 were modified to collect separated plasma (by closing valve V4 and opening valve V5, with plasma pump P6 operating to convey plasma from the spinning membrane separator 26 into the plasma collection container F5), the change in volume of the contents of the plasma collection container F5 could be directly correlated to the stroke volume of the plasma pump P6 by the controller 18. Similarly, during a stage in which an additive fluid is drawn from the additive container F7 by operation of the plasma pump P6, the change in volume of the contents of the additive container F7 could be directly correlated to the stroke volume of the plasma pump P6.

With regard to the platelet collection container F6, the change in volume of its contents during the stage shown in FIG. 3 is directly attributable to the operation of the outlet pump P4, though it will be seen that only a portion of fluid pumped into the spinning membrane separator 26 by the outlet pump P4 is directed into the platelet collection container F6 (with the remainder being pumped into the return container F4), such that assessment of the stroke volume of the outlet pump P4 cannot be directly correlated to the change in volume of the contents of the platelet collection container F6 (due to the plasma pump P6 operating to draw a portion of the fluid out of the spinning membrane separator 26). In other stages of a procedure, all of the fluid pumped by the outlet pump P4 may be directed into the platelet collection container F6, such that the change in volume of the contents of the platelet collection container F6 during a period of time may be directly correlated to the stroke volume of the outlet pump P4 during the same time period.

Finally, it will be seen that the recirculation pump P5 does not directly pump fluid into a container associated with a volume measurement system, but rather recirculates a portion of a separated fluid component back into the centrifugal separation chamber 36. Accordingly, to correlate its stroke volume to a change in volume detected by a volume measurement system associated with a fluid container, the operation of other pumps must be considered. This may be most conveniently achieved during the stage of FIG. 3 by the controller 18 calculating the stroke volume of the recirculation pump P5 in view of the operation of the centrifuge pump P3, the plasma pump P6, and the volume measurement system associated with the return container F4, though it should be understood that other approaches may also be employed to correlating the stroke volume of the recirculation pump P5 to operation of a volume measurement system without departing from the scope of the present disclosure (which may include assessing the operation of the recirculation pump P5 during a different stage of a fluid processing procedure and/or correlating the operation of the recirculation pump P5 to one of the other volume measurement systems).

While a change in the weight or volume of the contents of a fluid container over a single period of time may be determined by the controller 18 and used to calculate the stroke volume of a pump, the controller 18 is programmed to first determine whether the volume measurement system associated with the fluid container is working properly before assessing the operation of the pump. The controller 18 assesses the operation of the volume measurement system by analyzing a plurality of signals that are periodically received from the volume measurement system during the course of a procedure. As explained above, each signal from the volume measurement system is indicative of the volume of the contents of the fluid container at a point in time during the procedure, such that the controller 18 may compare two successive signals from the volume measurement system to calculate the change in volume of the fluid in the fluid container during the time between receipt of the two signals. This is repeated by the controller 18 for a plurality of pairs of successive signals, with the controller 18 determining a plurality of changes in volume (corresponding to the number of pairs of successive signals from the volume measurement system that are analyzed by the controller 18).

The controller 18 next calculates a standard deviation of the plurality of changes in volume that it has calculated using the signals from the volume measurement system. Upon calculating the standard deviation of the changes in volume, the controller 18 compares the standard deviation to a target value or threshold. The magnitude of the target value or threshold may vary without departing from the scope of the present, though it may be advantageous for the target value or threshold to be relatively low to ensure that the volume measurement system is operating properly (as will be described).

When the calculated standard deviation is above the target value or threshold, the controller 18 determines that the volume measurement system is not operating properly and that signals from the volume measurement system cannot be relied upon to calculate the stroke volume of one or more corresponding pumps. In this case, the controller 18 may respond in any of a number of ways. For example, the controller 18 may continue accepting signals from the volume measurement system, calculating the change in volume between successive signals, and calculating the standard deviation of the changes in volume. Upon the standard deviation later registering as being less than the target value or threshold, the controller 18 may determine that the volume measurement system is operating properly and that signals from the volume measurement system may be relied upon to calculate the stroke volume of one or more corresponding pumps. This approach may be effective when a weight scale of a volume measurement system or an associated fluid container is bumped or otherwise temporarily disrupted, with the effect of a single event being smoothed out over time as the volume measurement system returns to its normal, proper operation. This approach may not be effective when there is a malfunction in the operation of the volume measurement system, in which case the controller 18 may generate a signal (e.g., an alert to an operator) indicating that the volume measurement system is not operating correctly. In yet another embodiment, upon determining that a volume measurement system is not operating correctly, the controller 18 may pause the fluid processing procedure, calculate a correction factor (as will be described in greater detail herein), and restart the procedure, with the operation of an appropriate pump being adjusted based at least in part on the correction factor.

When the calculated standard deviation is instead below the target value or threshold, the controller 18 determines that the volume measurement system is operating properly and that signals from the volume measurement system may be relied upon to calculate the stroke volume of one or more corresponding pumps. After calculating the stroke volume of the one or more pumps (as described above), the controller 18 compares a target change in volume of the fluid in the fluid container to an actual change in volume of the fluid in the fluid container. The controller 18 determines that the pump is operating properly when the target change in volume is equal to the actual change in volume and may allow for continued operation of the pump without adjustment to the rate at which the pump operates. Even after determining that a pump is operating properly, the controller 18 may continue monitoring its operation (as described above), with adjustments later being made to its operation, as necessary.

On the other hand, a difference between the target change in volume and the actual change in volume reflects improper operation of the pump, which the controller 18 addresses by calculating a correction factor for the pump. The controller 18 then adjusts the operation of the pump based at least in part on the correction factor in order to attempt to correct the operation of the pump. The nature of the correction factor may vary without departing from the scope of the present disclosure. In one embodiment, the correction factor is a multiplier that is applied to the operation of the pump. For example, if the controller 18 determines that the pump should be operating 10% faster than its current rate of operation, the correction factor may be 1.1, with the controller 18 multiplying the current rate of operation by 1.1 to effectively increase the rate of operation of the pump by 10%. Similarly, if the controller 18 determines that the pump is to operate at a lower rate, the correction factor may be less than one (e.g., 0.95), with the controller 18 multiplying the current rate of operation by the correction factor to effectively reduce the rate of operation of the pump. After the operation of a pump has been adjusted, the controller 18 may continue monitoring its performance to determine whether a subsequent adjustment to its operation (optionally using a different correction factor) is eventually required.

Such real-time calibration is advantageous for several reasons. For example, the procedure does not need to be paused, which would increase the time required to complete the procedure. Additionally, by calibrating the operation of a pump during a fluid processing procedure, rather than only during a priming stage, the operation of the pump when pumping a fluid of interest (e.g., blood or a blood component) may be determined, rather than adjusting the operation of the pump based on its performance when pumping a priming fluid (e.g., saline). Furthermore, by reacting in real-time, the calibration may be more accurate for a wider range of flow rates compared to calibration that is carried out at a single pump speed. Real-time calibration may also be advantageous by avoiding the possibility of pump operation being adjusted based on an isolated event that gives rise to inaccurate data (e.g., if a reading is taken at a time when the volume measurement system is inadvertently bumped or contacted by an operator).

While the difference between a target change in volume and an actual change in volume is characterized herein as improper operation of the pump, it should be understood that a variety of factors may lead to a difference between a target change in volume and an actual change in volume. However, while some other factor (e.g., deformation of a tube acted upon by the pump, as noted above) may be a more direct cause of this difference, the controller 18 it typically best suited to address the difference by controlling the operation of the pump, which is why it has been found to be advantageous for the controller 18 to be programmed to adjust the operation of the pump rather than being programmed to attempt to diagnose some other cause for the difference and then attempt to more directly address that cause (e.g., alerting an operator of the need to adjust the position of a tube acted upon by the pump).

The above-described protocol may be modified in any of a number of ways without departing from the scope of the present disclosure. For example, it may be the case that there are inaccuracies in initial readings from a volume measurement system when pumping first begins, such as at the beginning of a fluid processing procedure or immediately after resuming a procedure that has been paused. If it is determined that certain signals from the components of one or more of the volume measurement systems cannot be relied upon to calculate the stroke volume of the pumps, a blackout period (in which signals from one or more of the volume measurement systems are disregarded by the controller 18) may be employed to prevent such signals from being used to adjust the operation of a pump. If a blackout period is implemented, its duration may vary without departing from the scope of the present disclosure. For example, a blackout period may be maintained until a target volume of fluid has been pumped by the pump. In another embodiment, a blackout period may be maintained for a target amount of time. In yet another embodiment, the duration of a blackout period may be based on a rate at which the pump (or pumps) of interest is operating. In another embodiment, the controller 18 may be programmed to calculate a moving average over time for the stroke volume of a pump of interest during the blackout period in order to determine when initial inaccuracies have been overcome, followed by the blackout period being ended. A modification to such an approach could include the controller 18 extrapolating the moving average beyond the end of the blackout period, rather than ending the calculation when ending the blackout period, which may allow the controller 18 to predict acceptable values once pump stability has been established, with the controller 18 optionally notifying an operator when a subsequent value is outside of an expected range of acceptable values.

It should be understood that the execution of a blackout period is not limited to the beginning of a procedure or after resuming a procedure that has been paused, but that a blackout period may be employed at other times during a procedure. For example, it has been found to be beneficial to implement a blackout period at various points during a procedure in order to allow for the procedure to continue without generating an alert signal, such as when a weight scale of a volume measurement system or an associated fluid container has experienced a minor bump. In such a situation, the controller 18 may implement a blackout period and extrapolate out a predicted scale volume based on how the pump(s) should ideally be performing during the blackout period, from the point where the controller 18 determines that the scale readings cannot be trusted (e.g., when a standard deviation is too high or there has been a significant departure from a moving average). Once the controller 18 has determined that normal operation has resumed (e.g., based on analysis of a standard deviation or moving average), the controller 18 may end the blackout period without ever generating an alert signal. Otherwise, if normal operation has not resumed by the occurrence of a predetermined event (e.g., the elapse of a minimum amount of time or the processing of a minimum volume of fluid), the controller 18 may determine that an alert signal should be generated.

Regardless of how exactly the principles described herein are put into practice, it will be seen that they result in maximization of the overall accuracy of pump performance with minimal impact to cycle and procedure times.

IV. Aspects

Aspect 1. A fluid processing device comprising: a pump; a volume measurement system configured to be associated to a fluid container; and a controller programmed to control the operation of the pump and to receive a plurality of signals from the volume measurement system during a fluid processing procedure, wherein each of the plurality of signals received by the controller from the volume measurement system is indicative of a volume of a fluid in the fluid container associated with the volume measurement system at a different time during the fluid processing procedure, operation of the pump during the fluid processing procedure changes the volume of the fluid in the fluid container associated with the volume measurement system, and the controller is further programmed to (a) compare a pair of successive signals received from the volume measurement system during the fluid processing procedure to calculate a change in volume of the fluid in the fluid container associated with the volume measurement system during the time between receipt of said pair of successive signals, (b) repeat (a) for a plurality of pairs of successive signals so as to calculate the change in volume of the fluid in the fluid container associated with the volume measurement system for each of said plurality of pairs of successive signals, (c) calculate a standard deviation of said plurality of changes in volume of the fluid in the fluid container associated with the volume measurement system, determining that the volume measurement system is operating correctly when the standard deviation is below a target threshold and determining that the volume measurement system is not operating correctly when the standard deviation is above the target threshold, and (d) upon determining that the volume measurement system is operating correctly, calculate a stroke volume of the pump, compare a target change in volume of the fluid in the fluid container associated with the volume measurement system to an actual change in volume of the fluid in the fluid container associated with the volume measurement system, calculate a correction factor when there is a difference between the target change in volume of the fluid in the fluid container associated with the volume measurement system and the actual change in volume of the fluid in the fluid container associated with the volume measurement system, and adjust the operation of the pump based at least in part on the correction factor.

Aspect 2. The fluid processing device of Aspect 1, wherein the controller is further programmed to, upon determining that the volume measurement system is not operating correctly, repeat (b) and (c) until determining that the volume measurement system is operating correctly.

Aspect 3. The fluid processing device of Aspect 1, wherein the controller is further programmed to, upon determining that the volume measurement system is not operating correctly, generate a signal indicating that the volume measurement system is not operating correctly.

Aspect 4. The fluid processing device of Aspect 1, wherein the controller is further programmed to, upon determining that the volume measurement system is not operating correctly, pause the fluid processing procedure, calculate the correction factor, and restart the fluid processing procedure, with the operation of the pump being adjusted based at least in part on the correction factor.

Aspect 5. The fluid processing device of any one of the preceding Aspects, wherein the controller is further programmed to implement a blackout period before executing (a)-(d) at the beginning of the fluid processing procedure or after pausing and then restarting the fluid processing procedure or upon determining that the volume measurement system is not operating correctly.

Aspect 6. The fluid processing device of Aspect 5, wherein a duration of the blackout period is based on a volume of fluid processed since the beginning of the blackout period.

Aspect 7. The fluid processing device of Aspect 5, wherein a duration of the blackout period is based on time elapsed since the beginning of the blackout period.

Aspect 8. The fluid processing device of Aspect 5, wherein a duration of the blackout period is based on a rate at which the pump is operating.

Aspect 9. The fluid processing device of Aspect 8, wherein the controller is further programmed to calculate a moving average over time for the stroke volume of the pump during the blackout period.

Aspect 10. The fluid processing device of Aspect 9, wherein the controller is further programmed to extrapolate the moving average beyond the end of the blackout period.

Aspect 11. A method of executing a fluid processing procedure, comprising: (a) operating a pump so as to change a volume of a fluid in a fluid container associated with a volume measurement system; (b) receiving a plurality of signals from the volume measurement system during the fluid processing procedure, with each signal being indicative of the volume of the fluid in the fluid container associated with the volume measurement system at a different time during the fluid processing procedure; (c) comparing a pair of successive signals received from the volume measurement system to calculate a change in volume of the fluid in the fluid container associated with the volume measurement system during the time between receipt of said pair of successive signals; (d) repeating (c) for a plurality of pairs of successive signals so as to calculate the change in volume of the fluid in the fluid container associated with the volume measurement system for each of said plurality of pairs of successive signals; (e) calculating a standard deviation of said plurality of changes in volume of the fluid in the fluid container associated with the volume measurement system, determining that the volume measurement system is operating correctly when the standard deviation is below a target threshold and determining that the volume measurement system is not operating correctly when the standard deviation is above the target threshold; and (f) upon determining that the volume measurement system is operating correctly, calculating a stroke volume of the pump, comparing a target change in volume of the fluid in the fluid container associated with the volume measurement system to an actual change in volume of the fluid in the fluid container associated with the volume measurement system, calculating a correction factor when there is a difference between the target change in volume of the fluid in the fluid container associated with the volume measurement system and the actual change in volume of the fluid in the fluid container associated with the volume measurement system, and adjusting the operation of the pump based at least in part on the correction factor.

Aspect 12. The method of Aspect 11, further comprising, upon determining that the volume measurement system is not operating correctly, repeating (d) and (e) until determining that the volume measurement system is operating correctly.

Aspect 13. The method of Aspect 11, further comprising, upon determining that the volume measurement system is not operating correctly, generating a signal indicating that the volume measurement system is not operating correctly.

Aspect 14. The method of Aspect 11, further comprising, upon determining that the volume measurement system is not operating correctly, pausing the fluid processing procedure, calculating the correction factor, and restarting the fluid processing procedure, with the operation of the pump being adjusted based at least in part on the correction factor.

Aspect 15. The method of any one of Aspects 11-14, further comprising implementing a blackout period before executing (c)-(f) at the beginning of the fluid processing procedure or after pausing and then restarting the fluid processing procedure or upon determining that the volume measurement system is not operating correctly.

Aspect 16. The method of Aspect 15, wherein a duration of the blackout period is based on a volume of fluid processed since the beginning of the blackout period.

Aspect 17. The method of Aspect 15, wherein a duration of the blackout period is based on time elapsed since the beginning of the blackout period.

Aspect 18. The method of Aspect 15, wherein a duration of the blackout period is based on a rate at which the pump is operating.

Aspect 19. The method of Aspect 18, further comprising calculating a moving average over time for the stroke volume of the pump during the blackout period.

Aspect 20. The method of Aspect 19, further comprising extrapolating the moving average beyond the end of the blackout period.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A fluid processing device comprising: a pump; a volume measurement system configured to be associated to a fluid container; and a controller configured to control the operation of the pump and to receive a plurality of signals from the volume measurement system during a fluid processing procedure, wherein each of the plurality of signals received by the controller from the volume measurement system is indicative of a volume of a fluid in the fluid container associated with the volume measurement system at a different time during the fluid processing procedure, operation of the pump during the fluid processing procedure changes the volume of the fluid in the fluid container associated with the volume measurement system, and the controller is further configured to (a) compare a pair of successive signals received from the volume measurement system during the fluid processing procedure to calculate a change in volume of the fluid in the fluid container associated with the volume measurement system during the time between receipt of said pair of successive signals, (b) repeat (a) for a plurality of pairs of successive signals so as to calculate the change in volume of the fluid in the fluid container associated with the volume measurement system for each of said plurality of pairs of successive signals, (c) calculate a standard deviation of said plurality of changes in volume of the fluid in the fluid container associated with the volume measurement system, determining that the volume measurement system is operating correctly when the standard deviation is below a target threshold and determining that the volume measurement system is not operating correctly when the standard deviation is above the target threshold, and (d) upon determining that the volume measurement system is operating correctly, calculate a stroke volume of the pump, compare a target change in volume of the fluid in the fluid container associated with the volume measurement system to an actual change in volume of the fluid in the fluid container associated with the volume measurement system, calculate a correction factor when there is a difference between the target change in volume of the fluid in the fluid container associated with the volume measurement system and the actual change in volume of the fluid in the fluid container associated with the volume measurement system, and adjust the operation of the pump based at least in part on the correction factor.

2. The fluid processing device of claim 1, wherein the controller is further configured to, upon determining that the volume measurement system is not operating correctly, repeat (b) and (c) until determining that the volume measurement system is operating correctly.

3. The fluid processing device of claim 1, wherein the controller is further configured to, upon determining that the volume measurement system is not operating correctly, generate a signal indicating that the volume measurement system is not operating correctly.

4. The fluid processing device of claim 1, wherein the controller is further configured to, upon determining that the volume measurement system is not operating correctly, pause the fluid processing procedure, calculate the correction factor, and restart the fluid processing procedure, with the operation of the pump being adjusted based at least in part on the correction factor.

5. The fluid processing device of claim 1, wherein the controller is further configured to implement a blackout period before executing (a)-(d) at the beginning of the fluid processing procedure or after pausing and then restarting the fluid processing procedure or upon determining that the volume measurement system is not operating correctly.

6. The fluid processing device of claim 5, wherein a duration of the blackout period is based on a volume of fluid processed since the beginning of the blackout period.

7. The fluid processing device of claim 5, wherein a duration of the blackout period is based on time elapsed since the beginning of the blackout period.

8. The fluid processing device of claim 5, wherein a duration of the blackout period is based on a rate at which the pump is operating.

9. The fluid processing device of claim 8, wherein the controller is further configured to calculate a moving average over time for the stroke volume of the pump during the blackout period.

10. The fluid processing device of claim 9, wherein the controller is further configured to extrapolate the moving average beyond an end of the blackout period.

11. A method of executing a fluid processing procedure, comprising:

(a) operating a pump so as to change a volume of a fluid in a fluid container associated with a volume measurement system;

(b) receiving a plurality of signals from the volume measurement system during the fluid processing procedure, with each signal being indicative of the volume of the fluid in the fluid container associated with the volume measurement system at a different time during the fluid processing procedure;

(c) comparing a pair of successive signals received from the volume measurement system to calculate a change in volume of the fluid in the fluid container associated with the volume measurement system during the time between receipt of said pair of successive signals;

(d) repeating (c) for a plurality of pairs of successive signals so as to calculate the change in volume of the fluid in the fluid container associated with the volume measurement system for each of said plurality of pairs of successive signals;

(e) calculating a standard deviation of said plurality of changes in volume of the fluid in the fluid container associated with the volume measurement system, determining that the volume measurement system is operating correctly when the standard deviation is below a target threshold and determining that the volume measurement system is not operating correctly when the standard deviation is above the target threshold; and (f) upon determining that the volume measurement system is operating correctly, calculating a stroke volume of the pump, comparing a target change in volume of the fluid in the fluid container associated with the volume measurement system to an actual change in volume of the fluid in the fluid container associated with the volume measurement system, calculating a correction factor when there is a difference between the target change in volume of the fluid in the fluid container associated with the volume measurement system and the actual change in volume of the fluid in the fluid container associated with the volume measurement system, and adjusting the operation of the pump based at least in part on the correction factor.

12. The method of claim 11, further comprising, upon determining that the volume measurement system is not operating correctly, repeating (d) and (e) until determining that the volume measurement system is operating correctly.

13. The method of claim 11, further comprising, upon determining that the volume measurement system is not operating correctly, generating a signal indicating that the volume measurement system is not operating correctly.

14. The method of claim 11, further comprising, upon determining that the volume measurement system is not operating correctly, pausing the fluid processing procedure, calculating the correction factor, and restarting the fluid processing procedure, with the operation of the pump being adjusted based at least in part on the correction factor.

15. The method of claim 11, further comprising implementing a blackout period before executing (c)-(f) at the beginning of the fluid processing procedure or after pausing and then restarting the fluid processing procedure or upon determining that the volume measurement system is not operating correctly.

16. The method of claim 15, wherein a duration of the blackout period is based on a volume of fluid processed since the beginning of the blackout period.

17. The method of claim 15, wherein a duration of the blackout period is based on time elapsed since the beginning of the blackout period.

18. The method of claim 15, wherein a duration of the blackout period is based on a rate at which the pump is operating.

19. The method of claim 18, further comprising calculating a moving average over time for the stroke volume of the pump during the blackout period.

20. The method of claim 19, further comprising extrapolating the moving average beyond an end of the blackout period.

* * * * *